United States Patent [19]
Nishiji et al.

[11] Patent Number: 6,117,038
[45] Date of Patent: Sep. 12, 2000

[54] POWER TRANSMISSION DEVICE

[75] Inventors: Makoto Nishiji, Brussels, Belgium; Hirofumi Okuda, Konan-machi, Japan

[73] Assignee: Zexel Corporation, Japan

[21] Appl. No.: 09/320,801

[22] Filed: May 27, 1999

[30]  Foreign Application Priority Data

Jun. 2, 1998  [JP]  Japan .................................. 10-169298

[51] Int. Cl.⁷ .................................................. F16H 48/06
[52] U.S. Cl. ........................ 475/221; 475/204; 475/206; 475/198
[58] Field of Search ................................... 475/204, 205, 475/252, 248, 221, 198, 230, 231, 249; 74/650, 655

[56]  References Cited

U.S. PATENT DOCUMENTS

| | | |
|---|---|---|
| 1,938,649 | 12/1933 | Welsh . |
| 2,754,694 | 7/1956 | Schoenrock . |
| 2,789,446 | 4/1957 | Schoenrock . |
| 5,176,589 | 1/1993 | Borgudd . |
| 5,836,848 | 11/1998 | Janiszewski et al. .................... 475/204 |
| 5,971,882 | 10/1999 | Nishiji ..................................... 475/252 |

FOREIGN PATENT DOCUMENTS 7-117516  5/1995  Japan .

*Primary Examiner*—Charles A. Marmor
*Assistant Examiner*—Tisha D. Waddell
*Attorney, Agent, or Firm*—Eugene Stephens & Associates

[57]  ABSTRACT

A housing (2) includes first and second housing components (3A, 3B). The first and second components (3A, 3B) are fixed by bolts (6). Each bolt (6) extends through a central portion of a planet gear (72) of a planetary gear mechanism (7). The planet gear (72) is rotatably supported on the housing (3) through the bolts (6).

15 Claims, 3 Drawing Sheets

POWER TRANSMISSION DEVICE

TECHNICAL FIELD

This invention relates to a power transmission device suited to be used as, for example, a center differential for four-wheel drive vehicles.

BACKGROUND OF THE INVENTION

In general, a power transmission device used as a center differential for four-wheel vehicles includes a housing having a plurality of housing components fixed by bolts, and a planetary gear mechanism and a differential gear mechanism which are disposed on a rotational axis of the housing. A drive torque inputted from an engine into the planetary gear mechanism is transmitted to the differential gear mechanism through the housing and further to the front and rear wheel sides from one pair of side gears of the differential gear mechanism (see Japanese Patent Unexamined Publication (Kokai) No. Hei 7-117516).

The conventional power transmission device is large in part number, complicated in construction, and heavy in weight. Therefore, it is demanded that the number of parts be decreased.

SUMMARY OF THE INVENTION

As a result of hard study with a hope to satisfy the above demand, the inventor of the present invention found that the bolts for fixing the housing components can be used also as journal pins for rotatably supporting the planet gears of the planetary gear mechanisms, thereby enabling the omission of separate journal pins.

The present invention based on this finding comprises:

a housing having a plurality of housing components which can be assembled together in positions along a rotational axis of the housing, the housing components being mutually fixed by a bolt extending in parallel to the rotational axis;

a planetary gear mechanism disposed on the housing, the planetary gear mechanism including a sun gear rotatably disposed on the rotational axis of the housing, a planet gear disposed on the housing such that the planet gear can rotate not only about its own axis but also about the axis of the housing together with the housing, the planet gear being in mesh with the sun gear, and a ring gear being in mesh with the planet gear;

a differential gear mechanism disposed on the housing, the differential gear mechanism including a pair of side gears rotatably disposed on the rotational axis of the housing, and an element gear disposed on the housing such that the element gear can rotate not only about its own axis but also about the axis of the housing together with the housing, the element gear being in mesh with at least one of the pair of side gears;

the bolt extending through a central portion of the planet gear; and the planet gear being rotatably supported on the housing through the bolt.

It is preferred that the housing includes first and second housing components, the first housing component being provided thereon with the sun and planet gears of the planetary gear mechanism, the second housing component being provided therein with the differential gear mechanism.

It is also preferred that the differential gear mechanism includes plural pairs of the element gears, and each of the spider gear pairs is arranged in parallel to the rotational axis and spaced from each other in a circumferential direction of the housing.

It is also preferred that the planetary gear mechanism includes a plurality of planet gears, and the bolt is one of a plurality of bolts that rotatably supports each of the planet gears and is disposed between each pair of the element gears. In that case, the planet gears and the element gear pairs can be arranged on a circumference about the rotational axis.

It is preferred that the first housing component has an end face adjacent to the second housing component with a plurality of recesses for receiving the sun gear and the planet gear.

The housing can further include a third housing component disposed between the first housing component and the second housing component.

DETAILED DESCRIPTION OF THE INVENTION

Embodiments of the present invention will now be described with reference to FIGS. 1 to 4 of the accompanying drawings.

Figure 1:
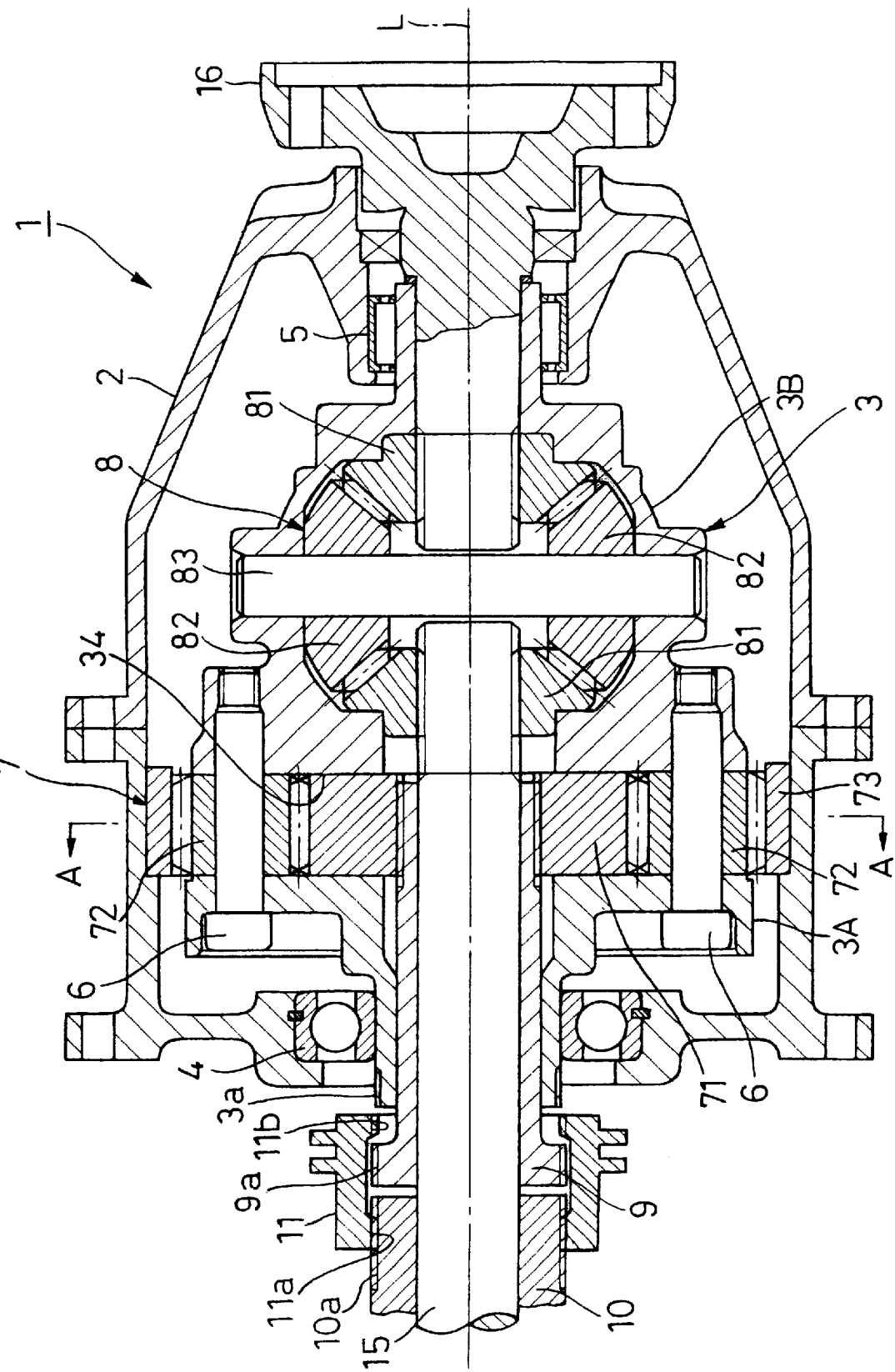
FIG. 1 is a sectional view taken on line B—B of FIG. 2, showing one embodiment of the present invention.
Figure 2:
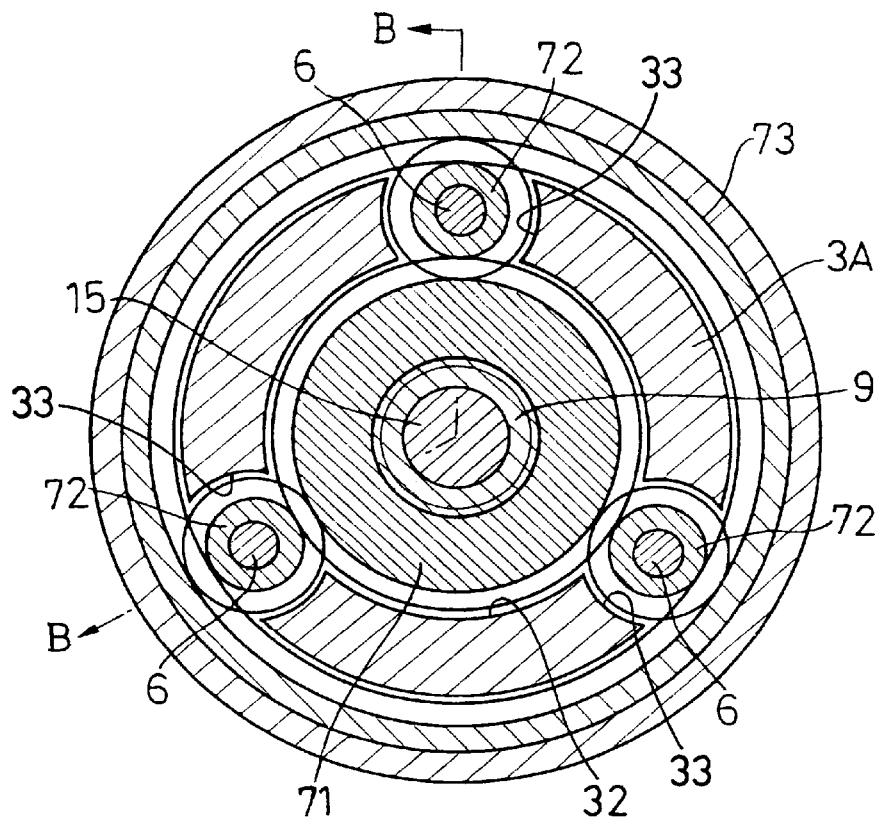
FIG. 2 is a sectional view taken on line A—A of FIG. 1.

FIGS. 1 and 2 show a power transmission mechanism 1 according to one embodiment of the present invention. This power transmission mechanism 1 is used as a center differential for fourwheel drive vehicles. The power transmission mechanism 1 can also be applied to other ways of use such as, for example, a rear differential.

The power transmission device 1 includes a differential case 2. This differential case 2 is fixed to a vehicle body (not shown). A housing 3 is disposed within the differential case 2. Opposite end portions of the housing 3 are rotatably supported on the differential case 2 through bearings 4, 5. This housing 3 is comprised of first and second housing components 3A, 3B which are divided by a plane vertical to a rotational axis L of the housing 3. Those two housing components 3A, 3B are in abutment with each other with axes thereof held in alignment, and they are fixed by a plurality of bolts 6. The bolts 6 are arranged in parallel to the rotational axis L on outer peripheral sides of the housing components 3A, 3B and equally spaced in a circumferential direction of the housing 3. The bolts 6 are allowed to extend through the first housing component 3A and threadingly engage with the second housing component 3B. Accordingly, when the bolt 6 is tightened, the housing components 3A, 3B are fixed to each other. Although the bolts 6 used in this embodiment are three, more or less can be used.

A planetary gear mechanism 7 is disposed within the casing 2. The planetary gear mechanism 7 includes a sun gear 71, a plurality of planet gears 72, and a ring gear 73. The sun gear 71 and the planet gears 72 are disposed on the housing 3, while the ring gear 73 is disposed on the differential case 2.

The housing component 3A has an end face 31 (see FIG. 4) adjacent to the housing component 3B with circular recesses 32, 33. The recess 32 is disposed at a central portion of the end face 31 with an axis thereof held in alignment with the rotational axis L. Three recesses 33 are employed in this embodiment, which are equal to the number of the bolts 6. The recesses 33 are equally spaced in a circumferential direction on a circumference about the rotational axis L. The recesses 32, 33 are covered by the housing component 3B. Alternatively, the recesses 32, 33 could be formed in an end face 34 of the housing component 3B, or they could be formed in both the end faces 31, 34.

The sun gear 71 is received in the recess 32. An inner end portion of an input sleeve 9, which is disposed on the rotational axis L, is coupled to a central portion of the sun gear 71. The input sleeve 9 is rotatably supported on the housing component 3A.

Accordingly, the sun gear 71 is rotatably supported on the housing component 3A through the input sleeve 9.

The planet gears 72 are rotatably received in the respective recesses 33. The planet gears 72 are in mesh with the sun gear 71. Accordingly, the planet gears 72, when the housing 3 is rotated, are rotated about their own axes and also rotated around the sun gear 71.

The ring gear 73 is fixed to an inner peripheral surface of the differential case 2 with an axis thereof held in alignment with the rotational axis L. The ring gear 73 is in mesh with the planet gears 72. Accordingly, when the sun gear 71 is driven for rotation by the input sleeve 9, the planet gears 72 and the housing 3 are driven for rotation at a reduced speed.

The three bolts 6 are arranged on the same circumference as the planet gears 72 and in the same angular positions. The bolts 6 extend through central portions of the planet gears 72. The planet gears 72 are rotatably supported on the bolts 6. Accordingly, the bolts 6 serve not only as means for fixing the housing components 3A, 3B to each other but also as journal pins for rotatably supporting the planet gears 72. Separate journal pins for rotatably supporting the planet gears 72 are not required in this power transmission device 1. The number of parts can be reduced to that extent.

An end portion of the housing component 3A, which end portion is carried on the bearing 4, projects outside from the differential case 2, and an external spline portion 3a is formed on the projected end portion of the housing component 3A. An outer end portion of the input sleeve 9, which is projected outside from the differential case 2 and the housing component 3A, is formed with an external spline portion 9a. The external spline 3a has the same size dimension as the external spline portion 9a. The differential case 2 is provided on the outside thereof with a drive sleeve 10. This drive sleeve 10 is disposed on the rotational axis L and driven by an engine (not shown). One end portion of the drive sleeve 10 is faced with the input sleeve 9 in proximate relation. An external spline portion 10a is formed on this end portion of the drive sleeve 10. The external spline portion 10a has the same size dimension as the external splines 3a, 9a.

On the outside of adjacent end portions of the input sleeve 9 and the housing component 3A, a ring sleeve 11 is movably disposed for movement in a direction of the rotational axis L. Internal spline portions 11a, 11b are formed in one and the other end portions of an inner peripheral surface of the ring sleeve 11, respectively. The internal spline portion 11a is normally engaged with the external spline portion 10a of the drive sleeve 10. The other internal spline portion 11b is switched between a first position where it is not engaged with any of the external spline portions 3a, 9a and a second position where it is selectively engaged with one of the external spline portions 3a, 9a, depending on the position of the ring sleeve 11. That is, when the ring sleeve 11 is moved to the position (this position is hereinafter referred to as the "neutral position") of FIG. 1, the internal spline portion 11b is located between and not engaged with either of the external spline portions 3a and 9a. When the ring sleeve 11 is moved rightwardly (this position is hereinafter referred to as the "high-speed position") in FIG. 1 from the neutral position, the internal spline portion 11b is engaged with the external spline portion 3a. When the ring sleeve 11 is moved leftwardly (this position is hereinafter referred to as the "low-speed position") in FIG. 1 from the neutral position, the internal spline portion 11b is engaged with the external spline portion 9a.

Since the internal spline portion 11b is not engaged with any of the external spline portions 3a, 9a when the ring sleeve 11 is moved to the neutral position, the rotation of the drive sleeve 10 is not transmitted to the planetary gear mechanism 7. When the ring sleeve 11 is moved to the high-speed position, the rotation of the drive sleeve 10 is transmitted to the housing 3 through the ring sleeve 11. Accordingly, the housing 3 and the planet gears 72 are rotated about the rotational axis L at the same speed as the drive sleeve 10. When the ring sleeve 11 is moved to the low-speed position, the rotation of the drive sleeve 10 is transmitted to the sun gear 71 through the ring sleeve 11 and the input sleeve 9.

Accordingly, the housing 3 and the planet gears 72 are rotated about the rotational axis L at a lower speed than the drive sleeve 10.

A differential gear mechanism 8 is disposed within the housing component 3B. The differential gear mechanism 3B includes one pair of side gears 81, 81 which are comprised of one pair of bevel gears and one pair of element gears 82, 82 which are comprised of one pair of bevel gears. The pair of side gears 81, 81 are rotatably supported on the housing 3 with axes thereof held in alignment with the rotational axis L. The pair of element gears 82, 82 are rotatably supported on a journal pin 83 vertical to the rotational axis L. Accordingly, the pair of element gears 82, 82 are rotatable about the journal pin 83 and also rotatable about the rotational axis L together with the housing 3. The element gears 82, 82 are in mesh with the side gears 81, 81. Accordingly, when the housing 3 is rotated, its rotation is transmitted to the pair of side gears 81, 81 through the journal pin 83 and the element gears 82, 82. The rotation, which has been transmitted to one of the side gears 81, 81, is transmitted to the front or rear differential (both not shown) through an output shaft 15. The rotation, which has been transmitted to the other side gear 81, is transmitted to the rear or front differential through an output shaft 16. The relative rotation of the pair of side gears 81, 81 makes it possible to rotate the output shafts 15, 16 differentially.

In the power transmission device 1 thus constructed, since the bolts 6 for fixing the housing components 3A, 3B are also used as journal pins for rotatably supporting the planet gears 72 of the planetary gear mechanism 7, there is no need to separately use the journal pins for rotatably supporting the planet gears 72. Accordingly, the number of parts can be decreased to that extent. As a result, the housing 3 can be made smaller in size and thus, the overall power transmission device 1 can be made smaller in size.

Figure 3:
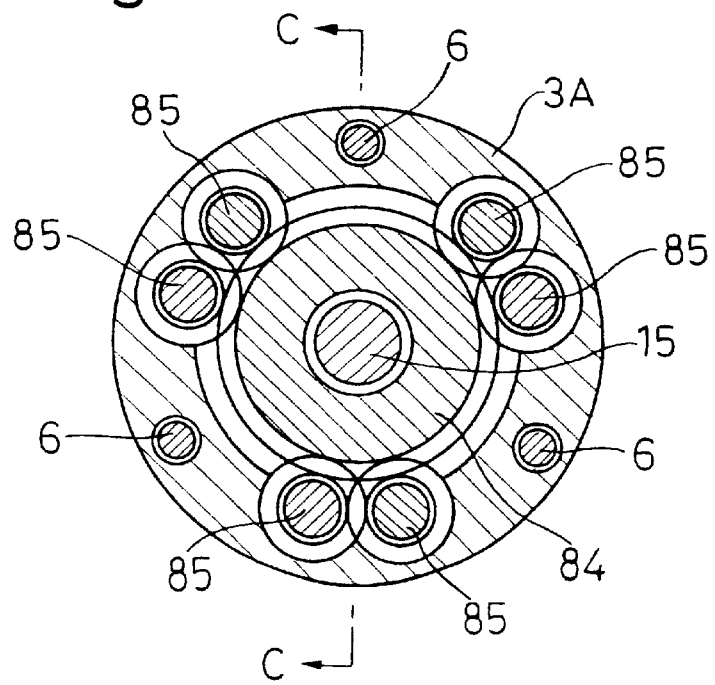
FIG. 3 is a sectional view taken on line D—D of FIG. 4, showing another embodiment of the present invention.
Figure 4:
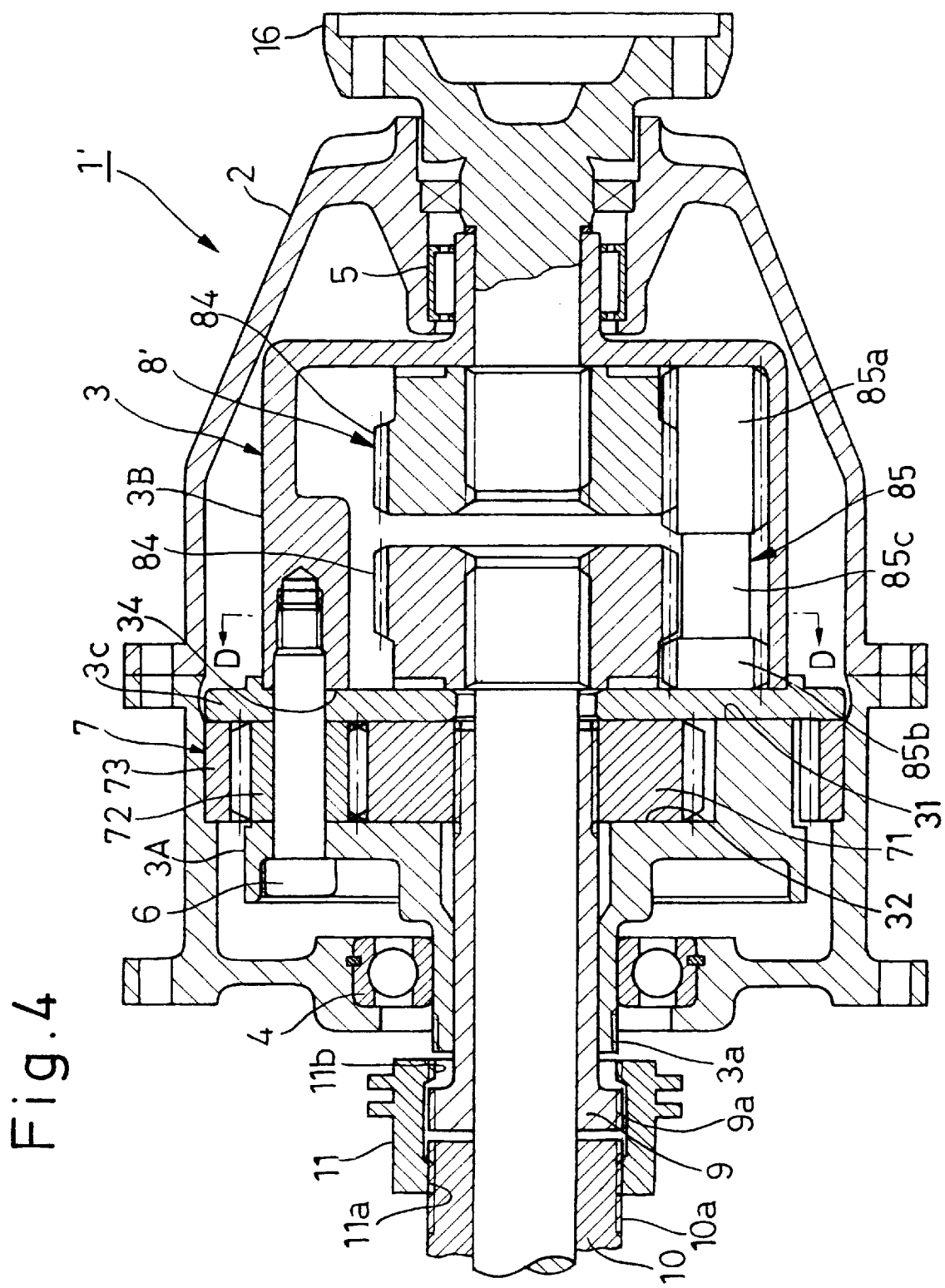
FIG. 4 is a sectional view taken on line C—C of FIG. 3.

Another embodiment of the present invention will now be described with reference to FIGS. 3 and 4. In this embodiment, only the different portions in construction from the above-mentioned embodiment are described, and identical component parts are designated by identical reference numeral and description thereof is omitted.

In a power transmission device 1' according to this embodiment, a third housing component 3C is disposed between the housing component 3A and the housing component 3B. In other words, the housing 3 is comprised of the housing components 3A, 3B, 3C which can be assembled in a direction of the rotational axis L. The housing component 3C is formed in a plate-like configuration. The bolts 6 extend through the housing component 3C. Accordingly, when the bolts 6 are tightened, the housing components 3A, 3B are pushed against opposite end faces of the housing component 3C and the housing components 3A, 3B, 3C are fixed to each other by the bolts 6. Also, the recesses 32, 33 are covered by the housing component 3C.

In the power transmission device 1', a differential gear mechanism 8' is employed instead of the differential gear mechanism 8. The differential gear mechanism 8' includes one pair of side gears 84, 84 and three pairs of element gears 85, 85. The side gears 84, 84 are comprised of helical gears. They are rotatably arranged on the rotational axis L. Each element gear 85 is provided on one end portion thereof with a long gear portion 85a, on the other end portion with a short gear portion 85b, and on an intermediate portion with a neck portion 85c. The element gears 85, 85 are arranged in parallel to the rotational axis L and supported on the housing 3 such that they can be rotated about their own axes, and they can also be rotated about the rotational axis L together with the housing 3. The long gear portion 85a of each spider gear 85 is in mesh, at an inner portion thereof (that portion on the side of the short gear portion 85b), with one side gear 84 of the pair of side gears 84, 84 and at an outer portion thereof, with the short gear portion 85b of the other element gear 85. The short gear portion 85b of each element gear 85 is in mesh, at an outer portion thereof, with the long gear portion 85a of the other element gear 85.

The three pairs of element gears 85, 85 are equally spaced in the circumferential direction of the housing 3. They are spaced in the circumferential direction of the housing 3 from the bolts 6. Especially, in this embodiment, they are located at the center of the three bolts 6, 6.

In the power transmission device 1' thus constructed, since the bolts 6 and the element gear pairs 85, 85 are arranged such that they are spaced in the circumferential direction from the housing 3, the bolts 6 and the element gears 85 can be arranged on a same circumference. In case the bolts 6 and the element gears 85 are arranged in the same position in the circumferential direction, the former and the latter would be required to be arranged on different circumferences so that they do not interfere with each other. Accordingly, the housing 3 would be enlarged in size to that extent; and therefore, the power transmission device would be enlarged in size. The bolts 6 and the element gears 85 can be arranged on the same circumference in this power transmission device 1'. Therefore, the housing 3 can be reduced in diameter and the power transmission device 1' can be made smaller in size.

It should be noted that the present invention is not limited to the above embodiments, and many changes can be made in accordance with necessity. For example, although the bolts 6 extend through the first housing component 3A and are threadingly engaged with the second housing component 3B in the above embodiments, it is also accepted that the bolts 6 are allowed to extend further through the other housing component 3B and a nut is screwed to a forward end (that end which is extended through the housing component 3B) of each bolt 6 so that the housing components 3A, 3B (or 3A, 3B, 3C) are fixed to each other by the bolts 6 and the nuts.

What is claimed is:

1. A power transmission device comprising:

a housing having a plurality of housing component elements which can be assembled together in positions along a rotational axis of the housing, said housing components being mutually fixed by a bolt extending in parallel to the rotational axis;

a planetary gear mechanism disposed on said housing, said planetary gear mechanism including a sun gear rotatably disposed on the rotational axis of said housing, a planet gear disposed on said housing such that said planet gear can rotate not only about its own axis but also about the axis of said housing together with said housing, said planet gear being in mesh with said sun gear, and a ring gear being in mesh with said planet gear;

a differential gear mechanism disposed on said housing, said differential gear mechanism including a pair of side gears rotatably disposed on the rotational axis of said housing, and an element gear disposed on said housing such that said element gear can rotate not only about its own axis but also about the axis of said housing together with said housing, said element gear being in mesh with at least one of said pair of side gears;

said bolt extending through a central portion of said planet gear;

said planet gear being rotatably supported on said housing through said bolt;

said housing including first and second housing components, said first housing component being provided thereon with said sun gear and said planet gear of said planetary gear mechanism, said second housing component being provided therein with said differential gear mechanism;

said planetary gear mechanism including a plurality of planet gears and a plurality of bolts that fix together said first and second housing components; and all of said bolts by which said housing components are fixed together rotatably support said planet gears.

2. A power transmission device according to claim 1, wherein said differential gear mechanism includes plural pairs of said element gears, each of said element gear pairs is arranged in parallel to the rotational axis and spaced from each other in a circumferential direction of said housing, said element gears of each pair mesh with each other, and each of said element gears of said pairs mesh with one of said side gears.

3. A power transmission device according to claim 2, wherein said planetary gear mechanism includes a plurality of planet gears, and a plurality of bolts rotatably supporting each of said planet gears is disposed between each pair of said element gears.

4. A power transmission device according to claim 3, wherein said planet gears and said element gear pairs are arranged on a circumference about the rotational axis.

5. A power transmission device according to claim 2, wherein said first housing component has an end face adjacent to said second housing component with a plurality of recesses for receiving therein said sun gear and said planet gear.

6. A power transmission device according to claim 5, wherein said differential gear mechanism includes plural pairs of said element gears, and each of said element gear pairs is arranged in parallel to the rotational axis and spaced from each other in a circumferential direction of said housing.

7. A power transmission device according to claim 6, wherein said planetary gear mechanism includes a plurality of said planet gears, and said bolt is one of a plurality of bolts that rotatably supports each of said planet gears and is disposed between each pair of said element gears.

8. A power transmission device comprising:

a housing having a plurality of housing component elements which can be assembled together in positions along a rotational axis of the housing, said housing components being mutually fixed by a bolt extending in parallel to the rotational axis;

a planetary gear mechanism disposed on said housing, said planetary gear mechanism including a sun gear rotatably disposed on the rotational axis of said housing, a planet gear disposed on said housing such that said planet gear can rotate not only about its own axis but also about the axis of said housing together with said housing, said planet gear being in mesh with said sun gear, and a ring gear being in mesh with said planet gear;

a differential gear mechanism disposed on said housing, said differential gear mechanism including a pair of side gears rotatably disposed on the rotational axis of said housing, and an element gear disposed on said housing such that said element gear can rotate not only about its own axis but also about the axis of said housing together with said housing, said element gear being in mesh with at least one of said pair of side gears;

said bolt extending through a central portion of said planet gear;

said planet gear being rotatably supported on said housing through said bolt;

said housing including first and second housing components, said first housing component being provided thereon with said sun gear and said planet gear of said planetary gear mechanism, said second housing component being provided therein with said differential gear mechanism; and said housing further including a third housing component disposed between said first housing component and said second housing component, and said third housing component being formed in a plate-like configuration.

9. A power transmission device according to claim 8, wherein said differential gear mechanism includes plural pairs of said element gears, and each of said element gear pairs is arranged in parallel to the rotational axis and spaced from each other in a circumferential direction of said housing.

10. A power transmission device according to claim 9, wherein said planetary gear mechanism includes a plurality of planet gears, and said bolt is one of a plurality of bolts that rotatably supports each of said planet gears and is disposed between each pair of said element gears.

11. A power transmission device according to claim 10, wherein said planet gears and said element gear pairs are arranged on a circumference about the rotational axis.

12. A power transmission device according to claim 8, wherein said first housing component has an end face adjacent to said third housing component with a plurality of recesses for rotatably receiving therein said sun gear and said planet gear.

13. A power transmission device according to claim 12, wherein said differential gear mechanism includes plural pairs of said element gears, and each of said element gear pairs is arranged in parallel to the rotational axis and spaced from each other in a circumferential direction of said housing.

14. A power transmission device according to claim 13, wherein said planetary gear mechanism includes a plurality of planet gears, and said bolt is one of a plurality of bolts that rotatably supports each of said planet gears and is disposed between each pair of said element gears.

15. A power transmission device according to claim 14, wherein said planet gears and said element gear pairs are arranged on a circumference about the rotational axis.

* * * * *

UNITED STATES PATENT AND TRADEMARK OFFICE
CERTIFICATE OF CORRECTION

PATENT NO. : 6,117,038
DATED : September 12, 2000
INVENTOR(S) : Makoto Nishiji and Hirofumi Okuda It is certified that error appears in the above-identified patent and that said Letters Patent is hereby corrected as shown below:

Claim 5,
Line 1, delete "2" and insert -- 1 --.

Signed and Sealed this

Ninth Day of October, 2001

Attest:

*Nicholas P. Godici*

NICHOLAS P. GODICI
*Attesting Officer*     *Acting Director of the United States Patent and Trademark Office*